Patented May 2, 1944

2,347,688

UNITED STATES PATENT OFFICE 2,347,688

ROSIN AND ABIETIC ACID SALTS OF A GUANIDINE AS A MOTHPROOFER

David W. Jayne, Jr., Old Greenwich, Conn., assignor to American Cyanamid Company, New York, N. Y., a corporation of Maine No Drawing. Application February 8, 1940, Serial No. 317,890

3 Claims. (Cl. 167—37)

The present invention relates to a guanidine or substituted guanidine salt of rosin or abietic acid, useful as mothproofing agents.

Substituted guanidines, such as dixylyl guanidines, are known to possess good mothproofing properties when applied to textile fabrics, such as woolen cloth, etc., in the form of their fatty acid salts, dissolved in appropriate organic solvent. However, it is often desirable to apply the mothproofing compound to the cloth in a solution other than naphtha, usually used with the mothproofing compound above mentioned. Moreover, the fatty acid salts above referred to, when applied to cloth and from which the solvent has evaporated, leave a residual greasy feeling. Moreover, such fatty acid salts are expensive.

It has been discovered that the guanidine and substituted guanidine salts of rosin and/or abietic acid are soluble in carbon tetrachloride and that woolen cloth treated with dilute solutions thereof may be effectively mothproofed.

Although I prefer to use dixylyl guanidine, yet any unsubstituted, mono- or polysubstituted guanidines may be used. Among such substituted guanidines are the alkyls, such as methyl, ethyl, propyl, butyl and the like; among the aryl groups, phenyl, tolyl and naphthyl or the like or the guanidines may be an alkyl aryl substitution product.

Either rosin may be used as such because of its cheapness and availability or, if desired, it may be replaced in whole or in part with abietic acid.

For instance, a mixture of 27 grams of di-mixed-xylyl guanidine and 30 grams of wood rosin were stirred and heated to about 150° C. until evolution of gas ceased and a clear melt resulted. The cooled product was a clear, brittle, amber colored resin readily soluble in carbon tetrachloride.

Again, a mixture of 27 grams of di-mixed-xylyl guanidine and 30 grams of abietic acid were stirred and heated to about 150° C. until evolution of gas ceased and a clear melt resulted. The cooled product was a brittle, dark-colored resin soluble in carbon tetrachloride but practically insoluble in petroleum naphtha.

A mothproofing composition was made by dissolving 14 grams of the dixylyl guanidne rosinate in 6 grams of butyl cellosolve and 180 grams of paint and varnish makers' naphtha. This gave a clear, amber solution containing 3% of dixylyl guanidine by volume.

14 grams of dixylyl guanidine rosinate were dissolved in 360 grams of carbon tetrachloride to give a clear amber solution of the above concentration.

14 grams of dixylyl guanidine abietate were dissolved in 6 grams of butyl cellosolve and 350 grams of carbon tetrachloride to give a dark amber colored solution.

Pieces of flannel, when sprayed with the above solutions in amounts equivalent to from ½ to one gallon thereof to twenty pounds of cloth were resistant to damage by webbing clothes moth larvae.

Other guanidine rosinates and abietates may be likewise prepared by simple reaction between the ingredients.

While the invention has been described with particular reference to specific embodiments, it is to be understood that it is not to be limited thereto, but is to be construed broadly and restricted solely by the scope of the appended claims.

I claim:

1. A mothproofing composition containing a substance chosen from the group consisting of a guanidine rosinate and a guanidine abietate.

2. A mothproofing composition containing a guanidine rosinate.

3. A mothproofing composition containing a guanidine abietate.

DAVID W. JAYNE, JR.